(12) United States Patent
Park et al.

(10) Patent No.: US 7,626,753 B2
(45) Date of Patent: Dec. 1, 2009

(54) COLOR FILTER SUBSTRATE, ELECTROPHORETIC DISPLAY DEVICE HAVING THE SAME, AND METHOD THEREOF

(75) Inventors: Jae Byung Park, Seongnam-si (KR); Cheol-Woo Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/931,179

(22) Filed: Oct. 31, 2007

(65) Prior Publication Data

US 2008/0117496 A1 May 22, 2008

(30) Foreign Application Priority Data

Nov. 20, 2006 (KR) ...................... 10-2006-0114294

(51) Int. Cl.
  *G02B 26/00* (2006.01)
  *G09G 3/34* (2006.01)
(52) U.S. Cl. ........................................ 359/296; 345/107
(58) Field of Classification Search ................ 359/296; 345/107; 430/32; 204/600
  See application file for complete search history.

(56) References Cited

U.S. PATENT DOCUMENTS

| | | | |
|---|---|---|---|
| 5,617,231 A | 4/1997 | Vinouze et al. | |
| 5,847,792 A | 12/1998 | Kobayashi et al. | |
| 5,920,364 A | 7/1999 | Akins et al. | |
| 6,829,078 B2* | 12/2004 | Liang et al. | 359/296 |
| 7,408,697 B2* | 8/2008 | Kawai | 359/296 |
| 2004/0145562 A1* | 7/2004 | Horikiri | 345/107 |

FOREIGN PATENT DOCUMENTS

WO 2004038497 A1 5/2004

OTHER PUBLICATIONS

European Search Report dated Mar. 12, 2008; Application No. 07021895.3-2205 (All references cited in search report are listed above).

* cited by examiner

*Primary Examiner*—William C Choi
(74) *Attorney, Agent, or Firm*—Cantor Colburn LLP

(57) ABSTRACT

A color filter substrate includes a base substrate, a white light-blocking part, and a color filter layer. The white light-blocking part is formed on the base substrate. The white light-blocking part divides the base substrate into a light-transmitting area and a light-blocking area. The color filter layer is formed in the light-transmitting area. Therefore, the white light-blocking part is formed so that a boundary of the pixel part is divided and a light-blocking function is realized. Furthermore, a white luminance characteristic is enhanced.

16 Claims, 9 Drawing Sheets

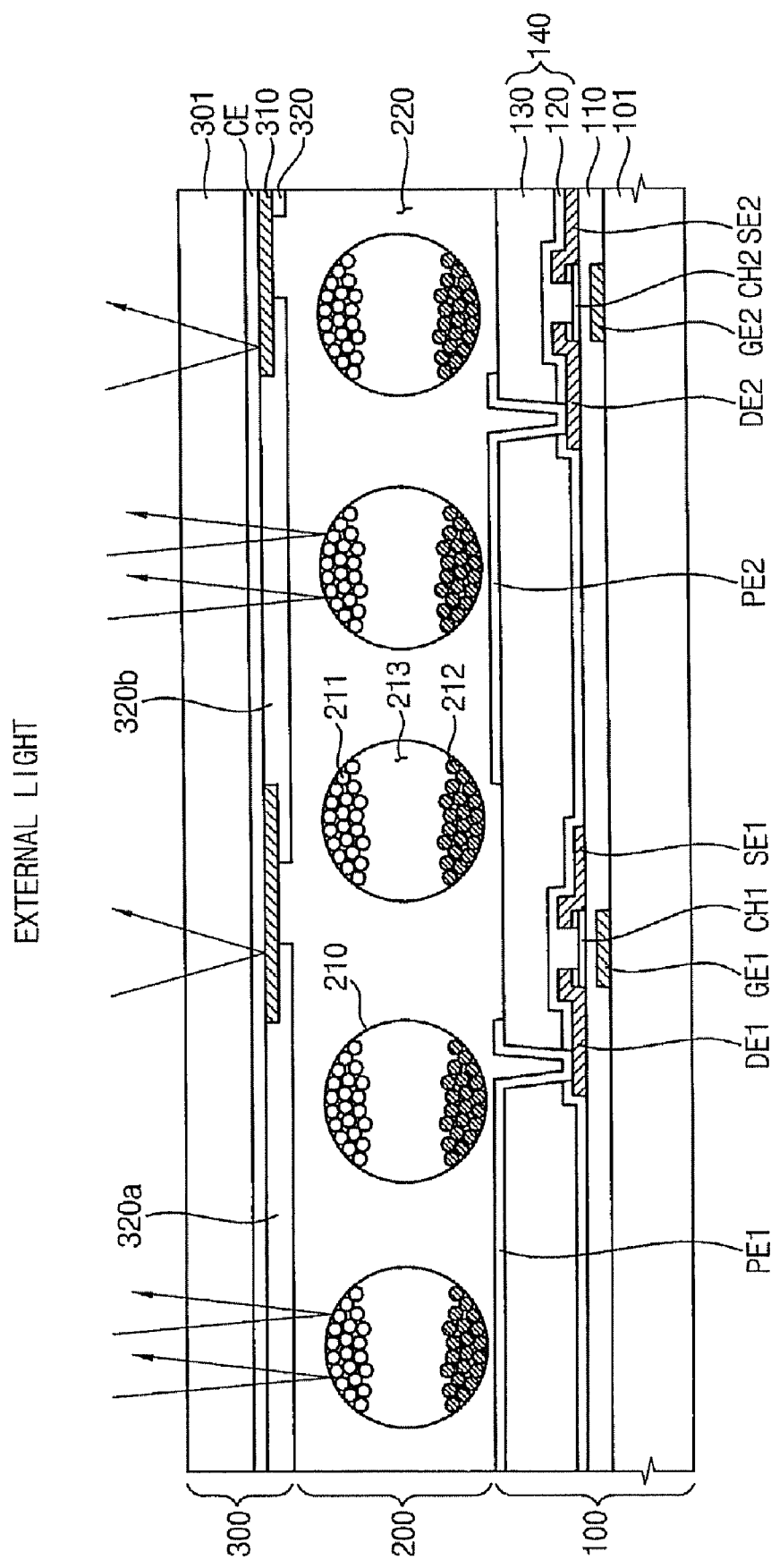

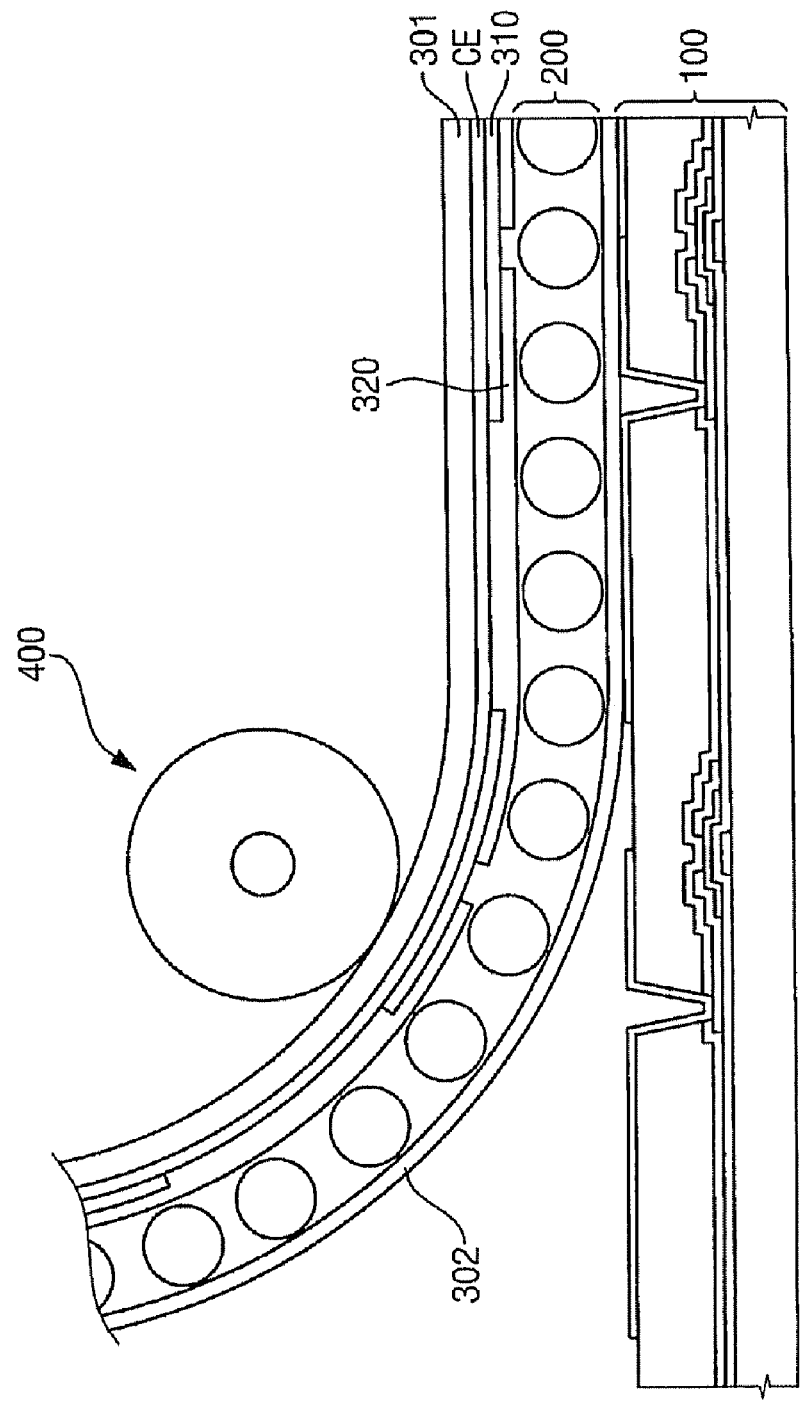

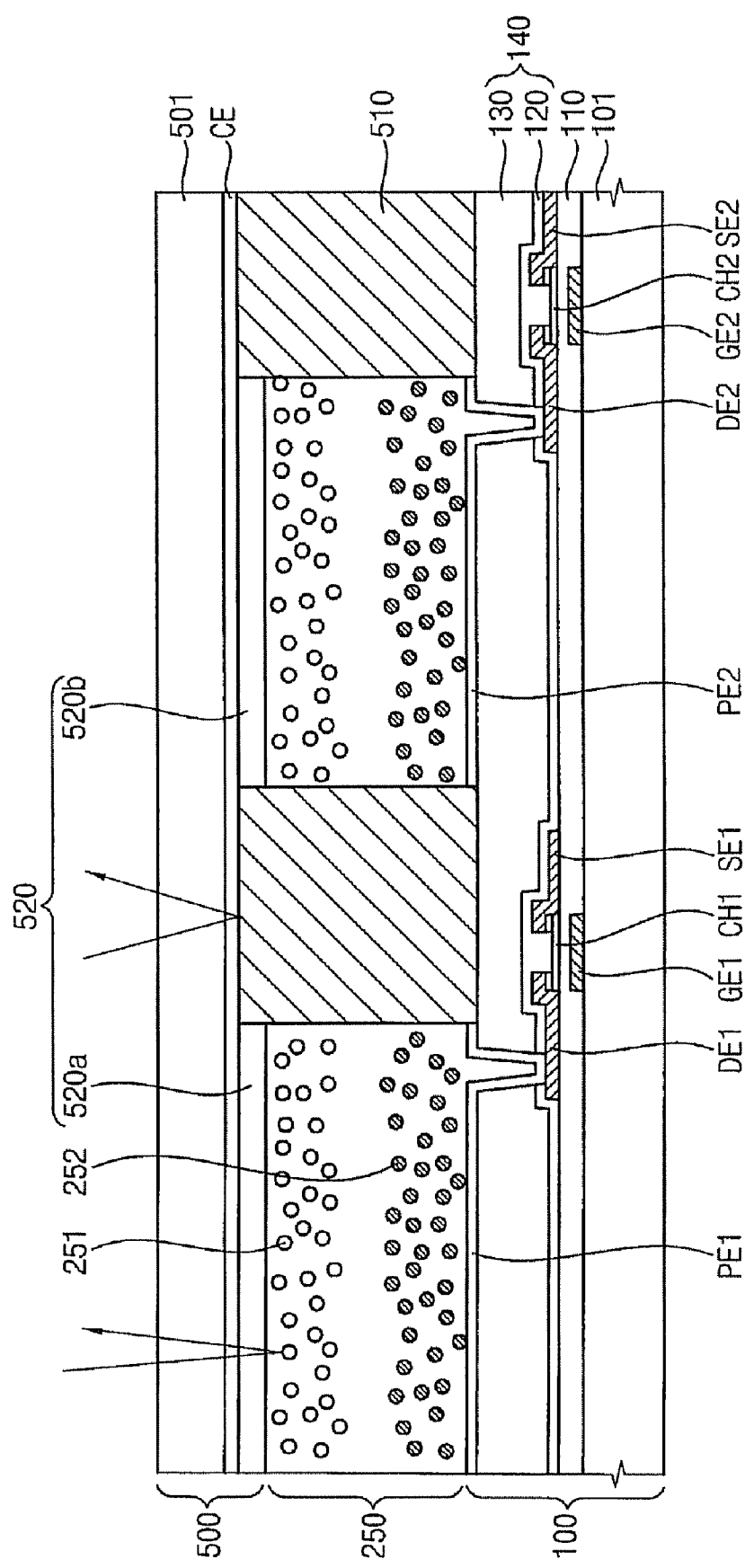

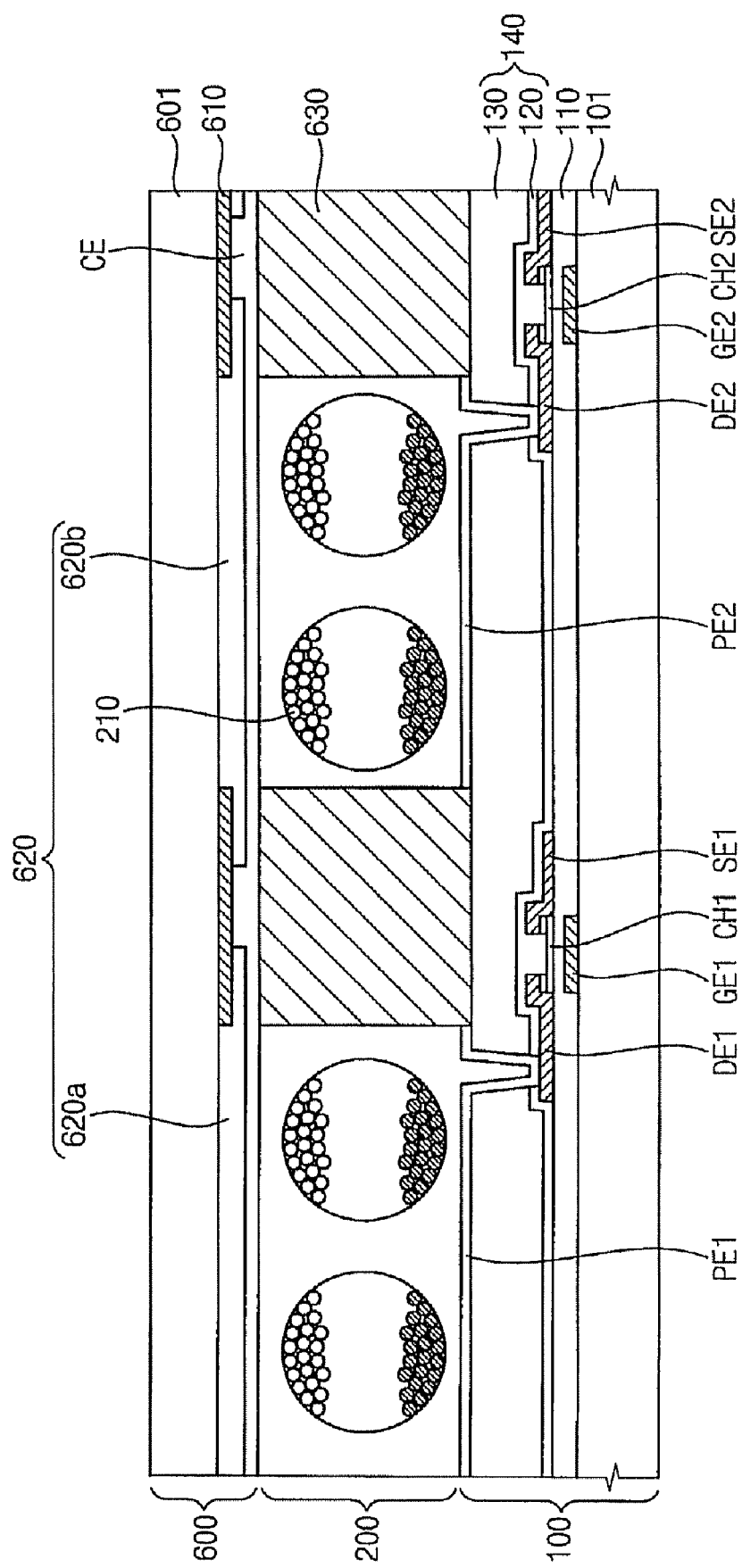

COLOR FILTER SUBSTRATE, ELECTROPHORETIC DISPLAY DEVICE HAVING THE SAME, AND METHOD THEREOF

This application claims priority to Korean Patent Application No. 2006-114294, filed on Nov. 20, 2006, and all the benefits accruing therefrom under 35 U.S.C. § 119, and the contents of which in its entirety are herein incorporated by reference.

BACKGROUND OF THE INVENTION

1. Field of the Invention

The present invention relates to a color filter substrate, an electrophoretic display ("EPD") device having the color filter substrate, and a method thereof. More particularly, the present invention relates to a color filter substrate capable of enhancing white luminance characteristics, an EPD device having the color filter substrate, and a method of enhancing a white luminance characteristic of the EPD device.

2. Description of the Related Art

FIG. 1 is a schematic diagram showing a conventional electrophoretic display ("EPD") device.

Referring to FIG. 1, in general, an EPD device has a reflect type structure that displays images by reflecting lights applied from an external side. The EPD device includes white ink particles 1 negatively charged, black ink particles 2 positively charged, microcapsules 5 surrounding transparent organic flowing substances 3, and binders surrounding and combining the microcapsules 5, that are disposed between two electrodes.

When an electric field is applied to the two electrodes, the white ink particles 1 move towards a view direction to display white images in a white state and the black ink particles 2 move towards the view direction to display black images in a black state. That is, lights applied from an external side are reflected by the white ink particles 1 that move towards the view direction, so that images are displayed.

The EPD device has a reflect type structure that displays images using lights applied from an external side, so that a contrast ratio ("C/R") of the EPD device is relatively low.

The EPD device is a type of flat panel display device that is commonly used for displaying an electronic book. The EPD device includes two panels having field-generating electrodes and a plurality of microcapsules 5 arranged between the panels. Each microcapsule 5 includes electric ink containing a plurality of white and black pigment particles 1, 2 that are respectively charged negatively and positively. When an electric field is applied to the microcapsules 5, the white and black particles 1, 2 move in opposite directions to display images.

The EPD device has high reflectance and high contrast regardless of the viewing angle, making reading from the EPD device substantially the same as reading from a paper image. In addition, the EPD device does not require polarizers, alignment layers, liquid crystal, etc., which are expensive components of a liquid crystal display ("LCD").

However, since dispersing the white and black ink particles 1, 2 with bi-stability in the microcapsule 5 is complicated, the manufacturing process and the production cost thereof are disadvantageous. Also, a separate color filter is required to display the image with full color.

BRIEF SUMMARY OF THE INVENTION

The present invention provides a color filter substrate capable of enhancing white luminance characteristics.

The present invention also provides an electrophoretic display ("EPD") device having the color filter substrate.

The present invention also provides a method of enhancing a white luminance characteristic of an EPD device.

In exemplary embodiments of the present invention, the color filter substrate includes a base substrate, a white light-blocking part, and a color filter layer. The white light-blocking part is formed on the base substrate. The white light-blocking part divides the base substrate into a light-transmitting area and a light-blocking area. The color filter layer is formed in the light-transmitting area.

In other exemplary embodiments of the present invention, the EPD device includes an array substrate, a color filter substrate, and an electrophoretic layer. The array substrate includes a plurality of pixel electrodes formed on a first base substrate. The color filter substrate includes a white light-blocking part formed on a second base substrate in a light-blocking area of the color filter substrate and a color filter layer formed in a light-transmitting area part of the color filter substrate. The electrophoretic layer is interposed between the array substrate and the color filter substrate, the electrophoretic layer including a plurality of electrophoretic particles.

In still other exemplary embodiments of the present invention, a method of enhancing a white luminance characteristic of an EPD device is disclosed. An array substrate having a plurality of pixel electrodes is formed. A color filter substrate having a white light-part is formed. An electrophoretic layer is formed between the array substrate and the color filter substrate. The electrophoretic layer includes a plurality of electrophoretic particles.

According to the color filter substrate, the EPD device having the color filter substrate, and the method thereof, the white light-blocking part is formed so that a boundary of the pixel part is divided and a light-blocking function is realized. Furthermore, a white luminance characteristic is enhanced.

BRIEF DESCRIPTION OF THE DRAWINGS

The above and other features and advantages of the present invention will become readily apparent by reference to the following detailed description when considered in conjunction with the accompanying drawings wherein:

FIG. 3 is a cross-sectional view showing an exemplary EPD device according to a first exemplary embodiment of the present invention taken along line I-I' of FIG. 2;

FIG. 5 is a cross-sectional view showing an exemplary method for manufacturing an exemplary EPD device in FIG. 3;

FIG. 7 is a cross-sectional view showing an exemplary EPD device according to a third exemplary embodiment of the present invention; and FIG. 8 is a cross-sectional view showing an exemplary EPD device according to a fourth exemplary embodiment of the present invention.

DETAILED DESCRIPTION OF THE INVENTION

Figure 1:
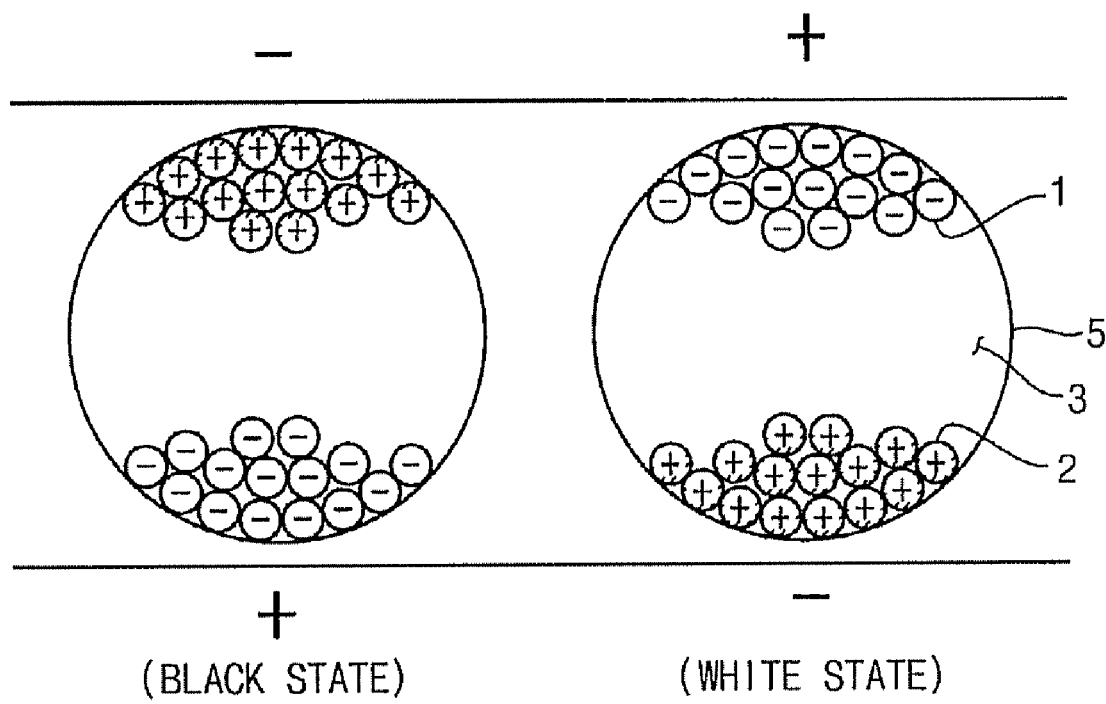
FIG. 1 is a schematic diagram showing a conventional electrophoretic display ("EPD") device according to the prior art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section described below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
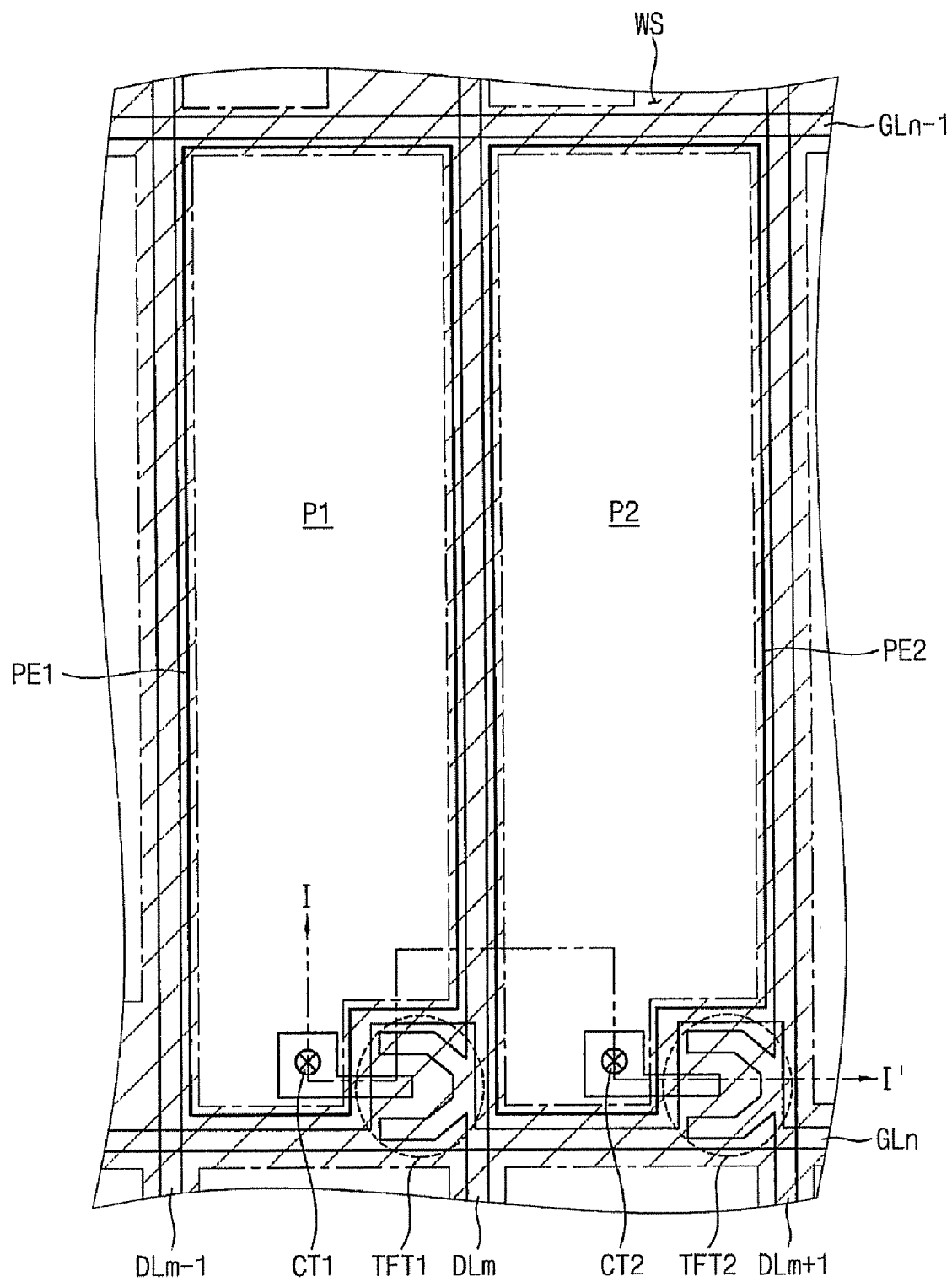
FIG. 2 is a plan view showing an exemplary EPD device according to an exemplary embodiment of the present invention.

FIG. 2 is a plan view showing an exemplary electrophoretic display ("EPD") device according to the present invention. FIG. 3 is a cross-sectional view showing an exemplary EPD device according to a first exemplary embodiment of the present invention. Particularly, FIG. 3 is a cross-sectional view taken along line I-I' shown in FIG. 2.

Referring to FIGS. 2 and 3, the EPD device includes an array substrate 100, an electrophoretic layer 200, and a color filter substrate 300.

The array substrate 100 includes a first base substrate 101. The first base substrate 101 includes a material that blocks light and reflects light. For example, the first substrate 101 may include materials having properties of a mirror, such as a mirror. A plurality of gate lines GLn−1 and GLn and a plurality of source lines DLm−1, DLm and DLm+1 are formed on the array substrate 101. The gate lines GLn−1 and GLn are extended along a first direction, and the source lines DLm−1, DLm and DLm+1 are extended along a second direction that crosses the first direction. For example, the first direction may be substantially perpendicular to the second direction. A plurality of pixel parts P1 and P2 are formed on the first base substrate 101. In one exemplary embodiment, the gate lines GLn−1 and GLn and the source lines DLm−1, DLm and DLm+1 define the plurality of pixel parts P1 and P2 on the first base substrate 101, however the pixel parts P1 and P2 may also be otherwise defined.

The first pixel part P1 includes a first switching element TFT1 and a first pixel electrode PE1. The first switching element TFT1 is electrically connected to an n-th gate line GLn and an m-th data line DLm. The first pixel electrode PE1 is electrically connected to the first switching element TFT1 through a first contact portion CT1.

The first switching element TFT1 includes a first gate electrode GE1, a gate insulation layer 110, a first channel part CH1, a first source electrode SE1, a first drain electrode DE1 and a protective insulation layer 140. The first gate electrode GE1 is electrically connected to the n-th gate line GLn. The gate insulation layer 110 is formed on the first gate electrode GE1. The gate insulation layer 110 is also formed on exposed surfaces of the first base substrate 101. The first channel part CH1 is formed on the gate insulation layer 110. The first source electrode SE1 is electrically connected to the m-th data line DLm. The first drain electrode DE1 is electrically connected to the first pixel electrode PE1. The protective insulation layer 140 is formed on the first source and drain electrodes SE1 and DE1, and may be further formed on exposed surfaces of the gate insulation layer 110. The protective insulation layer 140 may have a double layered structure including a passivation layer 120 and an organic insulation layer 130, as shown in FIG. 3. Alternatively, the protective insulation layer 140 may have a single layered structure including the passivation layer 120. The first pixel electrode PE1 is formed on the protective insulation layer 140, and is connected to the first drain electrode DE1 via the first contact portion CT1. The first contact portion CT1 includes a contact hole formed through the protective insulation layer 140.

When a gate signal is applied to the n-th gate line GLn, the first switching element TFT1 is turned-on to provide the first pixel electrode PE1 with the data signal applied to the m-th data line DLm.

The second pixel part P2 includes a second switching element TFT2 and a second pixel electrode PE2. The second switching element TFT2 is electrically connected to an n-th gate line GLn and an (m+1)-th data line DLm+1, and includes a second gate electrode GE2, the gate insulation layer 110, a second channel part CH2, a second source electrode SE2, and a second drain electrode DE2. The second pixel electrode PE2 is electrically connected to the second switching element TFT2 through a second contact portion CT2. The second switching element TFT2 has substantially the same structure of the first switching element TFT1 shown in FIGS. 2 and 3, so that any further explanation will be omitted.

The electrophoretic layer 200 includes a plurality of microcapsules 210 and a binder 220 that combines the microcapsules 210 to each other. Each of the microcapsules 210 includes a plurality of electrophoretic particles charged with a positive polarity charge and a plurality of electrophoretic particles charged with a negative polarity charge.

Particularly, each of the microcapsules 210 includes a white pigment 211, a black pigment 212, and a transparent dielectric substance 213. The white pigment 211 may include white ink particles, and the black pigment 212 may include black ink particles. For example, the white pigment 211 is charged with a positive polarity charge, and the black pigment 212 is charged with a negative polarity charge. When an external light is applied to the microcapsules 210, the white pigment 211 reflects the external light so that the white color is displayed.

The color filter substrate 300 includes a second base substrate 301. The second base substrate 301 may include a flexible material. For example, the second base substrate 301 may include polyethylene terephthalate ("PET") that has excellent light transmittance, thermal resistance, chemical resistance, physical strength, etc. A common electrode CE, a white light-blocking part WS as shown in FIG. 2 (examples of which will be further described below), and a color filter layer 320 are formed on the second base substrate 301.

A common electrode CE includes an optically transparent and electrically conductive material. The common electrode CE, as an opposite electrode facing the first and second pixel electrodes PE1 and PE2, receives a common voltage. The common electrode CE includes, for example, indium tin oxide ("ITO"), indium zinc oxide ("IZO"), amorphous-indium tin oxide ("a-ITO"), etc.

The white light-blocking part WS may be directly formed on the common electrode CE. For example, the common electrode CE may be formed on the second base substrate 301 to directly contact with the second base substrate 301. Alternatively, the common electrode CE may be formed on the color filter layer 320.

The white light-blocking part WS is formed in an area of the color filter substrate 300 corresponding to an area where the first and second pixel electrodes PE1 and PE2 are not formed on the array substrate 100, and then the white light-blocking part WS divides the second base substrate 301 into a light-transmitting area and a light-blocking area. For example, the white light-blocking part WS is formed in areas of the color filter substrate 300 corresponding to the first and second switching elements TFT1 and TFT2 and the gate and data lines GLn, DLm−1, DLm and DLm+1. The white light-blocking part WS may include a material including titanium oxide or aluminum oxide, and a polymer material such as acrylic resin, polystyrene, polyester, etc.

The white light-blocking part WS includes white material, so that an external light is blocked and a contrast ratio of the EPD device using a reflecting light may be enhanced.

In FIG. 3, a white light-blocking pattern 310 having a bar pattern shape is illustrated as an example of the white light-blocking part WS. Particularly, the white light-blocking pattern 310 defines a boundary between the pixel parts P1, P2, and blocks a reverse tilted domain ("RTD") formed between an area that the first and second pixel electrodes PE1 and PE2 are not formed and a peripheral area of the first and second pixel electrodes PE1 and PE2. Moreover, the white light-blocking pattern 310 blocks the light from directly irradiating to the first and second switching elements TFT1 and TFT2, and prevents a leakage current of the first and second switching elements TFT1 and TFT2 from increasing. Furthermore, the white light-blocking pattern 310 ensures a sufficient alignment margin to a combination process with the array substrate 100.

The color filter layer 320 is formed in the light-transmitting area, which is an area corresponding to the first and second pixel electrodes PE1 and PE2, which is defined by the white light-blocking pattern 310. The color filter layer 320 includes a red filter pattern 320a, a green filter pattern 320b, and a blue filter pattern 320c (shown in FIGS. 4D and 4E). For example, the color filter layer 320 may further include a white filter pattern (not shown). For example, the white filter pattern may be formed by overlapping the red, green, and blue filter patterns 320a, 320b, 320c. Alternatively, exposing the second base substrate 301 may form the white filter pattern.

Although not shown in FIG. 3, an over-coating layer may be formed on the color filter layer 320 to protect and planarize the red, green and blue filter patterns 320a, 320b, 320c.

The microcapsules 210 are formed between the first and second pixel electrodes PE1 and PE2 of the array substrate 100 and the common electrode CE of the color filter substrate 300. Each microcapsule 210 includes electric ink containing a plurality of white and black pigment particles, such as the white and black ink particles 211, 212, that are respectively negatively and positively charged. When an electric field is applied to the microcapsules 210, the white and black ink particles 211 and 212 move in opposite directions to display images.

Particularly, when a negative voltage, with respect to a common voltage VCOM applied to the common electrode CE, is applied to the first pixel electrode PE1, the white ink particles 211 having a positive polarity charge move towards the array substrate 100 and the black ink particles 212 having a negative polarity charge move towards the color filter substrate 300 so that a black image is displayed.

Inversely, when a positive voltage, with respect to a common voltage VCOM applied to the common electrode CE, is applied to the first pixel electrode PE1, the black ink particles 212 having a negative polarity charge move towards the array substrate 100 and the white ink particles 211 having a positive polarity charge move towards the color filter substrate 300 so that a white image is displayed.

FIGS. 4A to 4E are cross-sectional views showing an exemplary method for manufacturing an exemplary color filter substrate in FIG. 2.

Figure 4A:
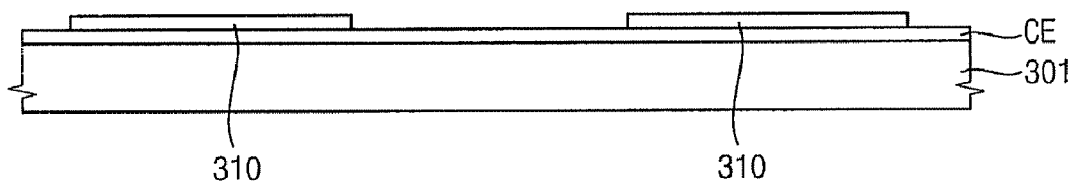
FIGS. 4A to 4E are cross-sectional views showing an exemplary method for manufacturing an exemplary color filter substrate in FIG. 2.

Referring to FIGS. 3 and 4A, a color filter substrate 300 includes a second base substrate 301. The second base substrate 301 includes, for example, an optically transparent plastic film having flexible characteristics. Alternatively, the second base substrate 301 may include a plastic material such as PET that has excellent light transmittance, thermal resistance, chemical resistance, physical strength, etc.

A common electrode CE of an optically transparent and electrically conductive material is formed on the second base substrate 301. For example, the common electrode CE may include ITO, IZO, a-ITO, etc.

A white inorganic material or a white organic material is formed on the second base substrate 301 having the common electrode CE formed thereon. For example, the white material may include a material including titanium oxide or aluminum oxide. For another example, the white material may include a polymer material such as acrylic resin, polystyrene, polyester, etc.

The white material is patterned to form a white light-blocking pattern 310 that defines a light-transmitting area and a light-blocking area in the second base substrate 301. The white light-blocking pattern 310 is formed in an area to correspond to an area of the array substrate 100 having the gate lines GLn−1 and GLn, the data lines DLm−1, DLm and DLm+1 and the switching elements TFT1 and TFT2 formed thereon. The white light-blocking pattern 310 may protect an external light and may enhance a contrast ratio ("C/R") of the EPD device using a reflecting light.

Particularly, the white light-blocking pattern 310 defines a boundary between the pixel parts P1 and P2. The white light-blocking pattern 310 corresponds to a portion where the first and second pixel electrodes PE1 and PE2 are not formed and blocks an RTD formed in an external portion of the first and second pixel electrodes PE1 and PE2. The white light-blocking pattern 310 blocks a light that is directly radiated to the switching elements TFT1 and TFT2, thereby preventing an increase of leakage current of the switching elements TFT1 and TFT2. Furthermore, the white light-blocking pattern 310 guarantees a sufficient alignment margin when the color filter substrate 300 is combined with the array substrate 100.

Figure 4B:
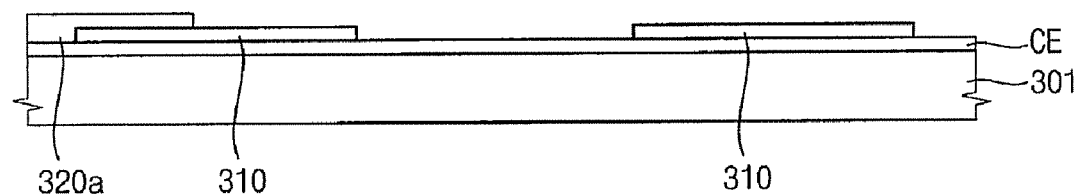

Referring to FIG. 4B, a first photoresist film (not shown) including red dyes or red pigments is uniformly deposited on the second base substrate 301 having the white light-blocking pattern 310 formed thereon. Then, the first photoresist film is patterned to form a red filter pattern 320a.

Figure 4C:
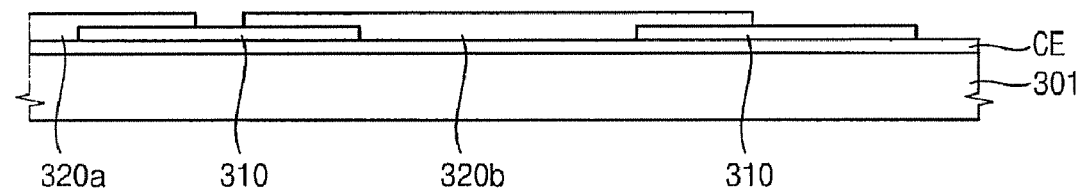

Referring to FIG. 4C, a second photoresist film (not shown) including green dyes or green pigments is uniformly deposited on the second base substrate 301 having the red filter pattern 320a formed thereon. Then, the second photoresist film is patterned to form a green filter pattern 320b.

Figure 4D:
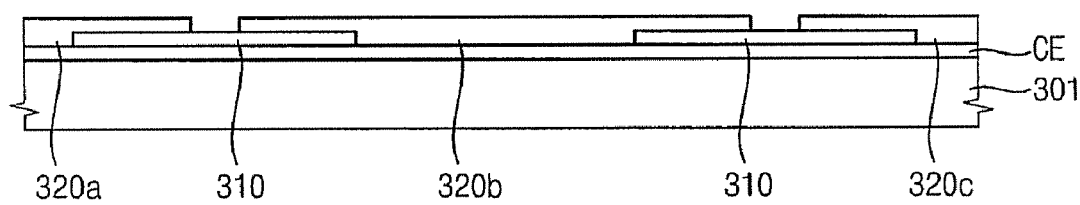

Referring to FIG. 4D, a third photoresist film (not shown) including blue dyes or blue pigments is uniformly deposited on the second base substrate 301 having the red and green filter patterns 320a and 320b formed thereon. Then, the third photoresist film is patterned to form a blue filter pattern 320c.

Figure 4E:
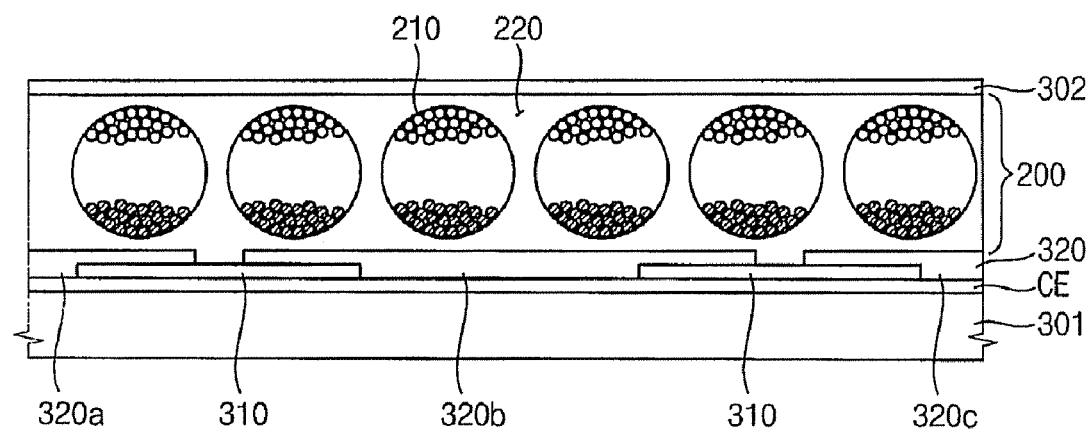

Referring to FIG. 4E, a plurality of microcapsules 210 is sprayed on the second base substrate 301, having the common electrode CE, the white light-blocking pattern 310, and the red, green and blue filter patterns 320a, 320b and 320c formed thereon, to form an electrophoretic layer 200. The microcapsules 210 may be sprayed with the binder 220 to form the electrophoretic layer 200. Then, an adhesive layer 302 is formed on the electrophoretic layer 200.

FIG. 5 is a cross-sectional view showing an exemplary method for manufacturing an exemplary EPD device in FIG. 3.

Referring to FIGS. 3 and 5, the color filter substrate 300 having the electrophoretic layer 200 formed thereon is attached to the array substrate 100. Particularly, the color filter substrate 300 having the electrophoretic layer 200 formed thereon using a laminator 400, is attached to a first surface of the array substrate 100 having the first and second pixel electrodes PE1 and PE2 formed thereon.

The color filter substrate 300 is combined with the array substrate 100 by the adhesive layer 302 formed on the electrophoretic layer 200, and the electrophoretic layer 200 is interposed between the color filter substrate 300 and the array substrate 100.

Figure 6:
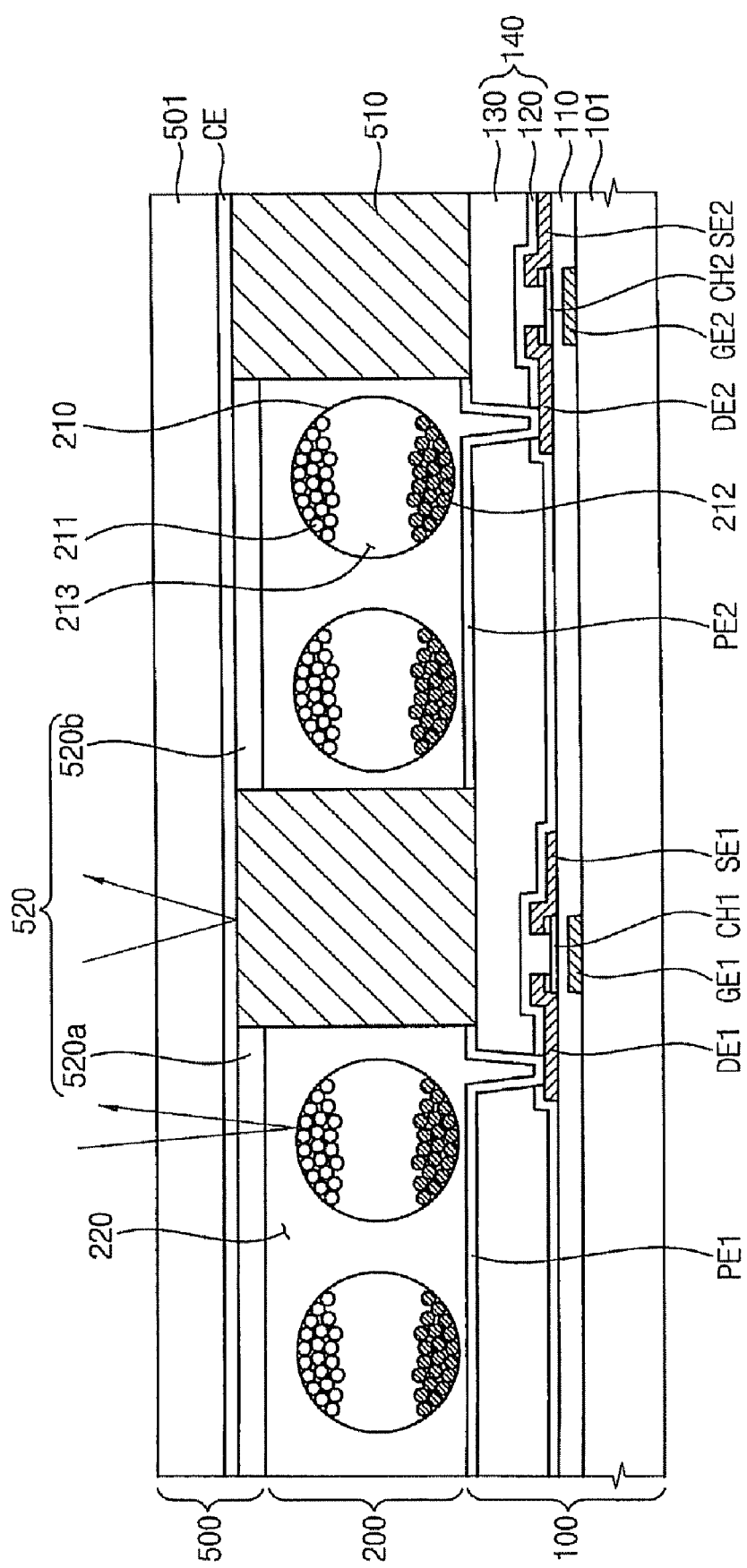
FIG. 6 is a cross-sectional view showing an exemplary EPD device according to a second exemplary embodiment of the present invention.

FIG. 6 is a cross-sectional view showing an exemplary EPD device according to a second exemplary embodiment of the present invention;

Referring to FIG. 6, an EPD device includes an array substrate 100, an electrophoretic layer 200, and a color filter substrate 500. The array substrate 100 and the electrophoretic layer 200 are substantially the same as in FIG. 3, so that a description concerning the array substrate 100 and the electrophoretic layer 200 will not be repeated in detail.

The array substrate 100 has a plurality of pixel parts. In an exemplary embodiment, the pixel parts may be defined by the gate lines GLn−1 and GLn and the data lines DLm−1, DLm and DLm+1, but are not restricted thereto. The gate lines GLn−1 and GLn cross the data lines DLm−1, DLm and DLm+1. A plurality of pixel electrodes, for example, the first and second pixel electrodes PE1 and PE2 are formed in the pixel parts.

The electrophoretic layer 200 includes a plurality of microcapsules 210 and a binder 220 combining the microcapsules 210 to each other. Each microcapsule 210 includes a white ink particle 211 that is negatively or positively charged, a black ink particle 212 that is differently charged from the white ink particle 211, and a transparent organic substance 213.

The color filter substrate 500 includes a second base substrate 501. The second base substrate 501 may include a flexible material. For example, the second base substrate 501 may include PET that has excellent light transmittance, thermal resistance, chemical resistance, physical strength, etc.

A common electrode CE, a white partition wall pattern 510, and a color filter layer 520 are formed on the second base substrate 501. The white partition wall pattern 510 is another example of the white light-blocking part WS.

The common electrode CE includes an optically transparent and electrically conductive material. The common electrode CE, as an opposite electrode facing the first and second pixel electrodes PE1 and PE2, receives a common voltage. The common electrode CE includes, for example, ITO, IZO, a-ITO, etc. The common electrode CE may be formed on the second base substrate 501 to directly contact with the base substrate 501. Alternatively, the common electrode CE may be formed on the color filter layer 520.

The white partition wall pattern 510 is formed in an area of the second base substrate 510 corresponding to an area where the first and second pixel electrodes PE1 and PE2 are not formed, and then the white partition wall pattern 510 divides the second base substrate 501 into a light-transmitting area and a light-blocking area such that the white partition wall pattern 510 forms a pixel space corresponding to each pixel electrode.

For example, the white partition wall pattern 510 is formed at locations corresponding to the first and second switching elements TFT1 and TFT2 and the gate and data lines GLn, DLm−1, DLm and DLm+1, so that the white partition wall pattern 510 forms a pixel space corresponding to the first and second pixel electrodes PE1 and PE2. The white partition wall pattern 510 may include a material including titanium oxide or aluminum oxide, and a polymer material such as acrylic resin, polystyrene, polyester, etc.

A plurality of microcapsules 210 is filled in each pixel space that is defined by the white partition wall pattern 510. An end portion of the white partition wall pattern 510 may be directly combined with the array substrate 100, so that the white partition wall pattern 510 closes the pixel space having the microcapsules 210 filled therein.

As a result, the ink particles 211 and 212 of the microcapsules 210 are moved in correspondence to an electric field that is generated by a voltage difference between the first and second pixel electrodes PE1 and PE2 and the common electrode CE, so that a gradation image is displayed.

The white partition wall pattern 510 is formed with a white material, so that the white partition wall pattern 510 may protect an external light and may enhance C/R of the EPD device that displays images using a reflecting light.

FIG. 7 is a cross-sectional view showing an exemplary EPD device according to a third exemplary embodiment of the present invention.

Referring to FIG. 7, an EPD device includes an array substrate 100, an electrophoretic layer 250, and a color filter substrate 500. The array substrate 100 is substantially the same as in FIG. 3 and the color filter substrate 500 is substantially the same as in FIG. 6, so that a description concerning the array substrate 100 and the color filter substrate 500 will not be repeated in detail.

The array substrate 100 has a plurality of pixel parts. In an exemplary embodiment, the pixel parts may be defined by the gate lines GLn−1 and GLn and the data lines DLm−1, DLm and DLm+1, but are not restricted thereto. The gate lines GLn−1 and GLn cross the data lines DLm−1, DLm and DLm+1. A plurality of pixel electrodes, for example, the first and second pixel electrodes PE1 and PE2 are formed in the pixel parts.

The color filter substrate 500 has the white partition wall pattern 510 formed in an area corresponding to an area where the first and second pixel electrodes PE1 and PE2 are not formed to define a plurality of pixel spaces. The color filter substrate 500 includes the color filter layer 520 formed in correspondence to the pixel spaces. The color filter layer 520 includes a plurality of color filter patterns 520a and 520b.

The electrophoretic layer 250 is formed in the pixel spaces that are defined by the white partition wall pattern 510.

The electrophoretic layer 250 includes a white ink particle 251 that is negatively or positively charged, and a black ink particle 252 that is differently charged from the white ink particle 251. The white and black ink particles 251 and 252 are filled in each pixel space.

An end portion of the white partition wall pattern 510 may be directly combined with the array substrate 100, so that the white partition wall pattern 510 closes the pixel spaces having the electrophoretic layer 250 filled therein.

As a result, the white and black ink particles 251 and 252 are moved in correspondence to an electric field that are generated by a voltage difference between the first and second pixel electrodes PE1 and PE2 and the common electrode CE, so that a gradation image is displayed.

FIG. 8 is a cross-sectional view showing an exemplary EPD device according to a fourth exemplary embodiment of the present invention.

Referring to FIG. 8, an EPD device includes an array substrate 100, an electrophoretic layer 200, and a color filter substrate 600. The array substrate 100 is substantially the same as in FIG. 3, and the electrophoretic layer 200 is substantially the same as in FIG. 6, although the electrophoretic layer 250 shown in FIG. 7 may alternatively be used. Thus, the same reference numerals will be used to refer to the same or like parts as those described in FIGS. 3 and 6 and any further explanation concerning the above elements will be omitted.

The color filter substrate 600 includes a second base substrate 601. The second base substrate 601 may include a flexible material. For example, the second base substrate 601 includes plastic material such as PET that has excellent light transmittance, thermal resistance, chemical resistance, physical strength, etc.

The color filter substrate 600 includes a white light-blocking part 610, a color filter layer 620, a common electrode CE, and a partition wall pattern 630 that are formed on the second base substrate 601. The white light-blocking part 610 may include a white light-blocking pattern having a white material.

Particularly, the white light-blocking pattern 610 is formed on the second base substrate 601. The white light-blocking pattern 610 is formed in an area that corresponds to where the first and second pixel electrodes PE1 and PE2 are not formed, and then the white light-blocking pattern 610 divides the second base substrate 601 into a light-transmitting area and a light-blocking area. The white light-blocking pattern 610 may include a material including titanium oxide or aluminum oxide, and a polymer material such as acrylic resin, polystyrene, polyester, etc.

The color filter layer 620 is formed on the second base substrate 601 having the white light-blocking pattern 610 formed thereon. The color filter layer 620 is formed in correspondence to a light-transmitting area defined by the white light-blocking pattern 610, which corresponds to the first and second pixel electrodes PE1 and PE2. The color filter layer 620 may partially overlap the white light-blocking part 610. The color filter layer 620 may include a red filter pattern 620a, a green filter pattern 620b, and a blue filter pattern. Alternatively, the color filter layer 620 may further include a white filter pattern (not shown). The red, green, and blue filter patterns may be overlapped with each other when viewed from a plan view of the color filter substrate 600, so that the white filter pattern may be formed. Alternatively, the second base substrate 601 is exposed, so that the color filter layer may not be formed. A common electrode CE is formed on the color filter layer 620 and may be further formed on exposed portions of the white light-blocking part 610. The common electrode CE includes a transparent and conductive material. The transparent and conductive material includes, for example, ITO, IZO, a-ITO, etc.

A partition wall pattern 630 defining a pixel space is formed at an overlapping area with the white light-blocking pattern 610 on the common electrode CE. The partition wall pattern 630 may include a white material and a black material. The partition wall pattern 630 may include a material including titanium oxide or aluminum oxide, and polymer material such as acrylic resin, polystyrene, polyester, etc.

A plurality of microcapsules 210 is filled in each pixel space that is defined by the partition wall pattern 630. An end portion of the partition wall pattern 630 may be directly combined with the array substrate 100, so that the partition wall pattern 630 closes the pixel space having the microcapsules 210 filled therein.

As a result, the ink particles 211 and 212 of the microcapsules 210 are moved in correspondence to an electric field that are generated by a voltage difference between the first and second pixel electrodes PE1 and PE2 and the common electrode CE, so that a gradation image is displayed.

The EPD device according to the fourth exemplary embodiment has the white light-blocking part 610, so that the white light-blocking part 610 may protect an external light and may enhance C/R of the EPD device using a reflecting light.

As described above, according to the present invention, the light-blocking part that defines a boundary of the pixel parts of the EPD device displaying images by reflecting an external light is formed with a white material, so that a light-blocking function is realized and a C/R of the EPD device is enhanced. Therefore, relatively low white luminance characteristics and relatively low C/R of the EPD device may be solved. Thus, a method of enhancing a white luminance characteristic of an EPD device by forming the EPD device using the white light-blocking part is provided.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A color filter substrate comprising:
   a base substrate;
   a color filter layer formed in a light-transmitting area of the base substrate;
   an electrophoretic layer disposed on the color filter layer, the electrophoretic layer comprising a plurality of electrophoretic particle; and
   a white light-blocking part including a partition wall pattern comprising a white material and dividing the color filter substrate into a plurality of pixel spaces, each of the pixel spaces receiving the electrophoretic particles,
   wherein the color filter layer comprises a plurality of color filter patterns formed on the pixel spaces, respectively, each of the color filter patterns is defined by the white light-blocking part.

2. The color filter substrate of claim 1, further comprising a common electrode disposed between the base substrate and the electrophoretic layer, the common electrode comprising optically transparent and electrically conductive material.

3. The color filter substrate of claim 1, wherein the white light-blocking part further includes a portion disposed between the base substrate and the partition wall pattern.

4. The color filter substrate of claim 3, wherein the portion of the white light-blocking part between the base substrate and the partition wall pattern has a thin film shape.

5. The color filter substrate of claim 1, wherein the partition wall pattern is white.

6. The color filter substrate of claim 1, wherein the white light-blocking part comprises a metal oxide material including titanium oxide or aluminum oxide, or a polymer material including acrylic resin, polystyrene or polyester.

7. An electrophoretic display device comprising:
   an array substrate comprising a plurality of pixel electrodes formed on a first base substrate;
   a color filter substrate comprising a second base substrate and a color filter layer formed in a light-transmitting area of the second base substrate;
   an electrophoretic layer interposed between the array substrate and the color filter substrate, the electrophoretic layer comprising a plurality of electrophoretic particles; and
   a white light-blocking part including a partition wall pattern comprising a white material and dividing the electrophoretic display device into a plurality of pixel spaces, each of the pixel spaces receiving the electrophoretic particles,
   wherein the color filter layer comprises a plurality of color filter patterns formed on the pixel spaces, respectively, each of the color filter patterns is defined by the white light-blocking part.

8. The electrophoretic display device of claim 7, wherein the color filter substrate further comprises a common electrode disposed between the second base substrate and the electrophoretic layer, the common electrode comprising optically transparent and electrically conductive material.

9. The electrophoretic display device of claim 7, wherein the electrophoretic layer comprises a plurality of microcapsules having electrophoretic particles.

10. The electrophoretic display device of claim 7, wherein the white light-blocking part is formed on a region of the second base substrate corresponding to a region of the array substrate disposed between areas having the pixel electrodes formed thereon.

11. The electrophoretic display device of claim 7, wherein the white light-blocking part further includes a portion disposed between the second base substrate and the partition wall pattern.

12. The electrophoretic display device of claim 7, wherein the partition wall pattern is white.

13. The electrophoretic display device of claim 7, wherein the white light-blocking part comprises a metal oxide material including titanium oxide or aluminum oxide, or a polymer material including acrylic resin, polystyrene or polyester.

14. The electrophoretic display device of claim 7, wherein the first base substrate blocks light and reflects light.

15. The electrophoretic display device of claim 7, wherein the array substrate further comprises a plurality of switching elements electrically connected to the plurality of pixel electrodes, respectively.

16. A method of enhancing a white luminance characteristic of an electrophoretic display device, comprising:
   forming an array substrate having a plurality of pixel electrodes;
   forming a color filter substrate;
   forming a white light-blocking part including a partition wall pattern that comprises a white material, the partition wall pattern dividing the electrophoretic display device into a plurality of pixel spaces; and
   forming an electrophoretic layer between the array substrate and the color filter substrate, the electrophoretic layer including a plurality of electrophoretic particles within the pixel spaces,
   wherein the color filter layer comprises a plurality of color filter patterns formed on the pixel spaces, respectively, each of the color filter patterns is defined by the white light-blocking part.

* * * * *